United States Patent
Lamar et al.

(10) Patent No.: US 8,922,962 B2
(45) Date of Patent: Dec. 30, 2014

(54) METHOD AND APPARATUS TO IMPROVE ESD ROBUSTNESS OF POWER CLAMPS

(75) Inventors: Washington Lamar, Mont Vernon, NH (US); Maxim Klebanov, Newton, MA (US)

(73) Assignee: Allegro Microsystems, LLC, Worcester, MA (US)

( * ) Notice: Subject to any disclaimer, the term of this patent is extended or adjusted under 35 U.S.C. 154(b) by 89 days.

(21) Appl. No.: 13/524,027

(22) Filed: Jun. 15, 2012

(65) Prior Publication Data

US 2013/0335868 A1  Dec. 19, 2013

(51) Int. Cl.
- *H02H 9/00* (2006.01)
- *H02H 9/04* (2006.01)
- *H02H 3/20* (2006.01)
- *H02H 3/22* (2006.01)

(52) U.S. Cl.
USPC .............................. 361/56; 361/91.1; 361/111

(58) Field of Classification Search
CPC ......... H02H 9/046; H02H 9/04; H02H 9/042; H02H 9/043; H02H 9/048; H01L 27/0248; H01L 27/027; H01L 27/0277; H01L 27/0285
USPC ..................................... 361/56, 57, 91.1, 111
See application file for complete search history.

(56) References Cited

U.S. PATENT DOCUMENTS

| | | |
|---|---|---|
| 2004/0160717 A1 | 8/2004 | May et al. |
| 2007/0127173 A1* | 6/2007 | Chang ............................. 361/56 |
| 2008/0074101 A1* | 3/2008 | Dobler et al. .............. 324/207.2 |
| 2010/0220419 A1* | 9/2010 | Krabbenborg et al. ......... 361/56 |
| 2011/0304940 A1 | 12/2011 | Cao et al. |
| 2013/0100562 A1* | 4/2013 | Croft ............................. 361/56 |

OTHER PUBLICATIONS

PCT search Report of the ISA for PCT/US2013/035407 dated Jul. 24, 2013.
Written Opinion of the ISA for PCT/US2013/035407 dated Jul. 24, 2013.
Dabral, et al.; "Basic ESD and I/O Design;" Jan. 1998; Chapter 2 (ESD Protection Methodology); pp. 17-83.

* cited by examiner

*Primary Examiner* — Rexford Barnie
*Assistant Examiner* — Christopher Clark
(74) *Attorney, Agent, or Firm* — Daly, Crowley, Mofford & Durkee, LLP (57) ABSTRACT

A power clamp circuit having improved robustness to electrostatic discharge (ESD) events includes a voltage regulation circuit and a current controlled switch. The voltage regulation circuit and the current controlled switch may be used to modify a snapback voltage of the power clamp in a manner that enhances the power clamp's ability to handle ESD events.

30 Claims, 6 Drawing Sheets

PRIOR ART

METHOD AND APPARATUS TO IMPROVE ESD ROBUSTNESS OF POWER CLAMPS

FIELD

Subject matter described herein relates generally to integrated circuits and, more particularly, to techniques and circuits for improving ESD robustness in integrated circuits.

BACKGROUND

Power clamps are circuits that can be used to protect other circuitry from damage due to overvoltage conditions caused by, for example, electrostatic discharge (ESD) and other noise events. However, power clamps themselves can be damaged if operating voltages and currents become too large. For example, if voltages exceed a certain value, one or more transistors within a power clamp can reach a condition known as secondary breakdown that can cause permanent damage to the clamp. This secondary breakdown mechanism limits the size of the electrostatic discharge (ESD) events that can be safely handled by a power clamp. Techniques and circuits are needed for increasing the robustness of power clamp circuits to ESD.

SUMMARY

In accordance with the concepts, systems, circuits, and techniques described herein, an integrated circuit comprises: (a) a supply node; (b) a ground node; and (c) a power clamp circuit coupled between the supply node and the ground node to protect the integrated circuit from a surge in voltage on the supply node, the power clamp circuit including: (i) a breakdown circuit coupled to the supply node to enter breakdown and conduct current away from the supply node when a voltage on the supply node exceeds a breakdown voltage; (ii) at least one transistor coupled between the supply node and an intermediate node, the at least one transistor to turn on if the current through the breakdown circuit exceeds a predetermined level; (iii) a voltage regulation circuit coupled to the supply node; and (iv) a current controlled switch coupled between the voltage regulation circuit and the ground node, the current controlled switch to connect the voltage regulation circuit to the ground node if a current flowing between the intermediate node and the ground node exceeds a threshold level.

In accordance with a further aspect of the concepts, systems, circuits, and techniques described herein, a method of operating a power clamp circuit includes: (a) turning on a transistor coupled between a supply node and a ground node of an integrated circuit in response to a voltage on the supply node exceeding a threshold level, the transistor to conduct current from the supply node to the ground node when turned on; and (b) activating a switch to cause a voltage regulation circuit to be coupled between the supply node and the ground node after the transistor is turned on, the voltage regulation circuit to conduct additional current from the supply node to the ground node after the switch is activated.

In accordance with a still further aspect of the concepts, systems, circuits and techniques described herein, an integrated circuit comprises: (a) a supply node; (b) a ground node; and (c) a power clamp circuit coupled to the power node to protect the integrated circuit from electrostatic discharge events and other noise events that can cause a surge in the voltage on the supply node, the power clamp circuit including: (i) a first portion to conduct current away from the supply node in response to a voltage on the supply node exceeding a predetermined voltage level; and (ii) a second portion to conduct additional current away from the supply node if an amount of current conducted away from the supply node by the first portion exceeds a threshold value.

BRIEF DESCRIPTION OF THE DRAWINGS

The foregoing features of this invention, as well as the invention itself, may be more fully understood from the following description of the drawings in which.

DETAILED DESCRIPTION

Figure 1:
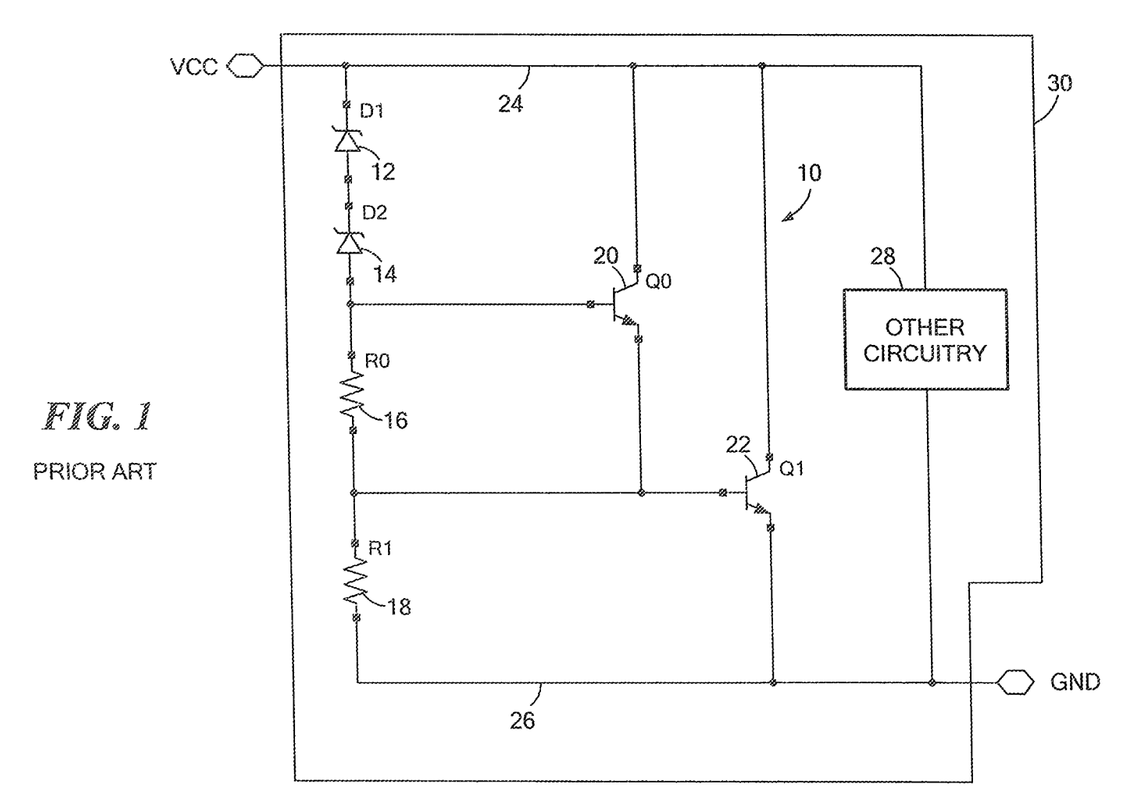
FIG. 1 is a schematic diagram illustrating a conventional zener-triggered power clamp circuit that may be modified in accordance with an implementation.

FIG. 1 is a schematic diagram illustrating a conventional zener-triggered power clamp circuit 10 that may be modified in accordance with an implementation. The zener-triggered power clamp circuit 10 may be implemented within, for example, an integrated circuit 30 to protect the integrated circuit 30 from damage caused by, for example, electrostatic discharge (ESD) events and/or other noise events. As illustrated, the zener-triggered power clamp circuit 10 includes: first and second zener diodes 12, 14; first and second resistors 16, 18; first and second transistors 20, 22; a supply node 24; and a ground node 26. Supply node 24 may be coupled to a supply terminal, contact, or lead of integrated circuit 30 that is to be connected to an external power supply when integrated circuit 30 is incorporated into a system. Similarly, ground node 26 may be coupled to a ground terminal, contact, or lead of integrated circuit 30 that is to be connected to an external ground when integrated circuit 30 is incorporated into a system.

When an ESD event occurs, a large amount of electrical charge may be placed upon supply node 24 of integrated circuit 30. This charge can increase the voltage on node 24 by a significant amount. If allowed to persist, this increased voltage can cause damage to circuitry 28 within integrated circuit 30. Zener-triggered power clamp circuit 10 may be used to reduce this voltage level before damage occurs.

First and second zener diodes 12, 14 each have an anode terminal and a cathode terminal. As illustrated in FIG. 1, the cathode terminal of first zener diode 12 is connected to supply node 24. The cathode terminal of second zener diode 14 is connected to the anode terminal of first zener diode 12. First resistor 16 is connected between the anode terminal of second zener diode 14 and second resistor 18. Second resistor 18 is connected between first resistor 16 and ground node 26.

In the illustrated implementation, first and second transistors 20, 22 are bipolar junction transistors (BJTs) each having a base terminal, a collector terminal, and an emitter terminal. The collector terminals of first and second transistors 20, 22 are both connected to supply node 24. The base terminal of transistor 20 is connected to a node between second zener diode 14 and first resistor 16. The base terminal of second transistor 22 is connected to a node between first and second resistors 16, 18. The emitter terminal of first transistor 20 is connected to the base terminal of second transistor 22. The emitter terminal of second transistor 22 is connected to ground node 26.

If an ESD event occurs during device operation, the voltage on supply node 24 may increase. If the voltage increases above a combined reverse breakdown voltage of first and second zener diodes 12, 14 (i.e., $BV_{D1}+BV_{D2}$), then the diodes 12, 14 will begin to conduct current toward ground node 26 through first and second resistors 16, 18. As the current through the resistors 16, 18 increases, a point may eventually be reached where first and second transistors 20, 22 are biased "on" and begin to conduct collector-emitter current $I_{CE}$. The collector-emitter current through second transistor 22 will tend to move charge away from supply node 24 to ground node 26. In addition, once turned "on," second transistor 22 may eventually cause the voltage on supply node 24 to "snap back" to a lower voltage that is less likely to cause damage within integrated circuit 30 (i.e., the snapback voltage, $V_{SB}$). This snap back in voltage may occur at a primary breakdown point of second transistor 22 (i.e., ($V_{T1}$, $I_{T1}$)).

After the voltage on supply terminal 24 snaps back, the voltage may continue to increase as a result of the ESD event. If this occurs, the collector-emitter current $I_{CE}$ through second transistor 22 will also increase in a relatively linear manner. Eventually, a secondary breakdown point of second transistor 22 may be reached (i.e., ($V_{T2}$, $I_{T2}$)). Secondary breakdown is capable of damaging or destroying a transistor and is to be avoided. In some aspects described herein, techniques and circuits are provided for decreasing the possibility that a power clamp will reach secondary breakdown during operation. In some implementations, the techniques and circuits may be used to allow a power clamp to handle, for example, larger ESD events without having to worry about damage to the corresponding circuitry. Although embodiments described herein relate to zener-triggered ESD protection circuits, it should be appreciated that the techniques also have application with other types of ESD protection circuits, including circuits using breakdown devices other than zener diodes.

Figure 2:
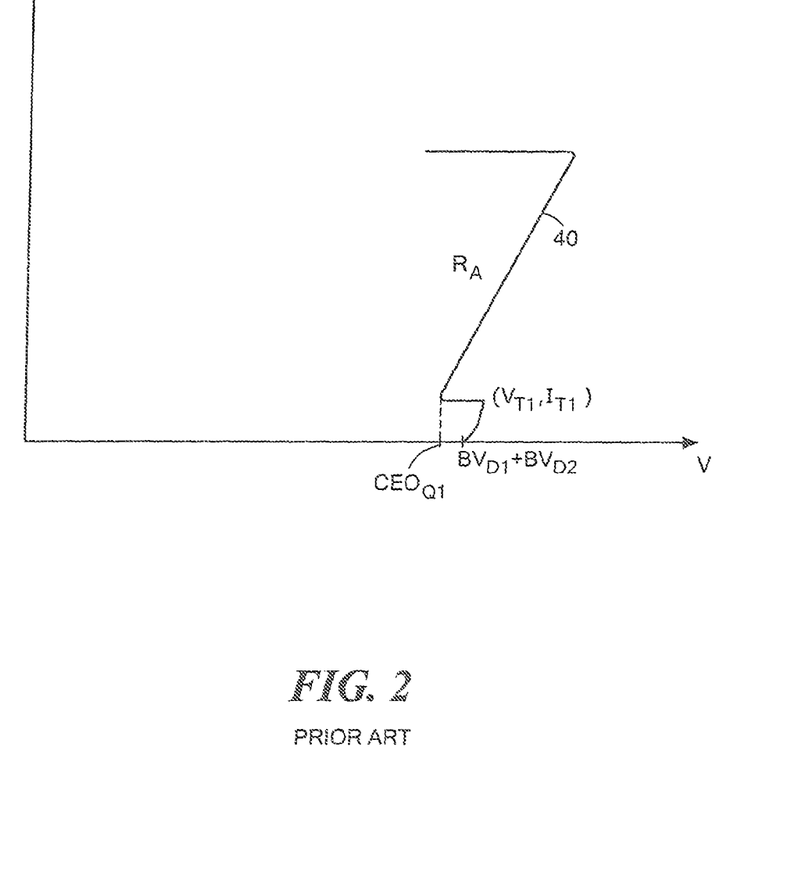
FIG. 2 is a graph illustrating a voltage-current curve of the zener-triggered power clamp circuit of FIG. 1.

FIG. 2 is a graph illustrating a current-voltage curve 40 of the zener-triggered power clamp circuit 10 of FIG. 1. In the graph of FIG. 2, the horizontal axis represents the voltage on the supply node of circuit 10 and the vertical axis represents the current of the entire clamp circuit. As shown in FIG. 2, as the voltage on the supply node is increased from zero, the current of the clamp remains close to zero until the voltage starts to approach the breakdown voltage of the series combination of first and second zener diodes 12, 14 (i.e., $BV_{D1}+BV_{D2}$). Typically, the voltage on supply node 24 will only get this high as a result of an ESD event or some other type of noise event. After the voltage passes this breakdown voltage, the current begins to increase until a primary breakdown point (i.e., $V_{T1}$, $I_{T1}$) of second transistor 22 is reached, at which point the voltage snaps backs to $V_{SB}$. As shown, the value of $V_{SB}$ is approximately equal to the common emitter breakdown voltage of second transistor 22 ($CEO_{Q1}$). From this point, the voltage may then increase further in a relatively linear manner with a dynamic resistance $R_A$ of transistor 22. If the voltage continues to rise, a secondary breakdown point ($V_{T2}$, $I_{T2}$) will eventually be reached.

Figure 3:
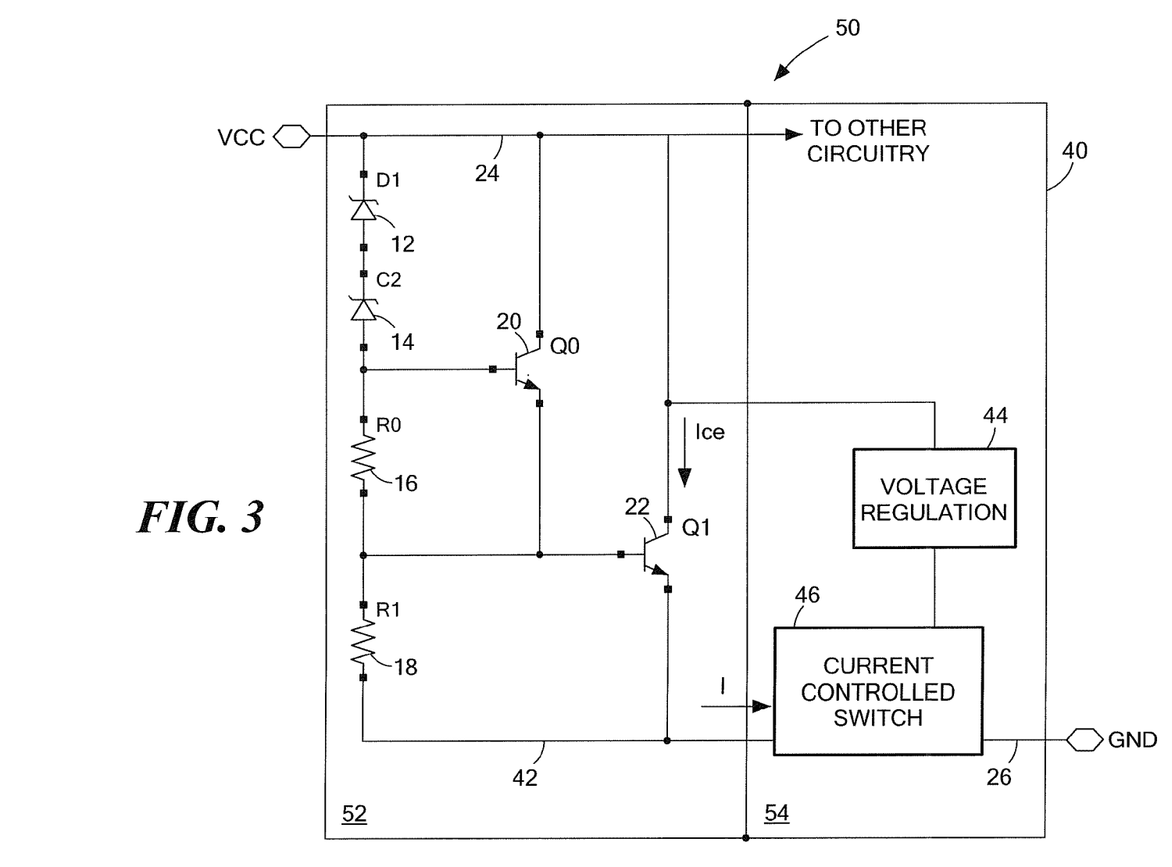
FIG. 3 is a schematic diagram illustrating an example zener-triggered power clamp circuit having enhanced ESD robustness in accordance with an implementation.

FIG. 3 is a schematic diagram illustrating an example zener-triggered power clamp circuit 50 having enhanced ESD robustness in accordance with an implementation. As shown, the zener-triggered power clamp circuit 50 includes a first portion 52 that is similar to power clamp circuit 10 of FIG. 1. In addition, zener-triggered power clamp circuit 50 includes a second portion 54 that is designed to improve the ESD robustness of the circuit 50. Zener-triggered power clamp circuit 50 may be part of, for example, an integrated circuit 40 in some implementations. As illustrated in FIG. 3, second portion 54 may include a voltage regulation circuit 44 and a current controlled switch 46. Voltage regulation circuit 44 may include one or more electrical devices or components that are capable of maintaining a relatively constant (or regulated) voltage when a varying current is flowing. This may include, for example, a zener diode, an avalanche diode, a silicon controlled rectifier (SCR), a series of forward biased diodes, a voltage regulator, and/or other components, including combinations of the above. Current controlled switch 46 is a switch that is operative for controllably coupling voltage regulation circuit 44 to ground node 26 in response to a current/flowing out of first portion 52 of zener-triggered power clamp circuit 50. Current controlled switch 46 may have an input connected to an intermediate node 42 of first portion 52 to receive the current I. As will be described in greater detail, current controlled switch 46 may be designed so that voltage regulation circuit 44 is connected to ground at an opportune time.

Before voltage regulation circuit 44 is coupled to ground node 26, little to no current is able to flow though the circuit 44. Voltage regulation circuit 44 will have little, if any, effect on power clamp operation until it is connected to ground node 26. After voltage regulation circuit 44 is connected to ground node 26 by current controlled switch 46, it may begin to conduct current from supply node 24 to ground node 26. While conducting current, a voltage across voltage regulation circuit 44 may remain relatively constant.

In at least one implementation, current controlled switch 46 is designed to connect voltage regulation circuit 44 to ground node 26 sometime after first and second zener diodes 12, 14 of first portion 52 of power clamp circuit 50 have reached breakdown. In some implementations, current controlled switch 46 may connect voltage regulation circuit 44 to ground node 26 when a current through second transistor 22 of FIG. 3 exceeds the primary breakdown current ($I_{T1}$) of second transistor 22. By connecting voltage regulation circuit 44 to ground at an appropriate time, a lower snapback voltage can be achieved than would be possible using first portion 52 of power clamp circuit 50 alone. In some implementations, this lower snapback voltage may be equal to the sum of the voltage across voltage regulation circuit 44 and the voltage across current controlled switch 46. By reducing the snapback voltage, power clamp circuit 50 may be less likely to reach secondary breakdown during operation, thus improving robustness to ESD.

As described above, the addition of voltage regulation circuit 44 and the current controlled switch 46 to zener-triggered power clamp circuit 50 improves the robustness of the circuit 50 to ESD events. The addition of these elements may also provide other benefits such as, for example, improved current uniformity, improved thermal distribution, and improved scalability.

Figure 4:
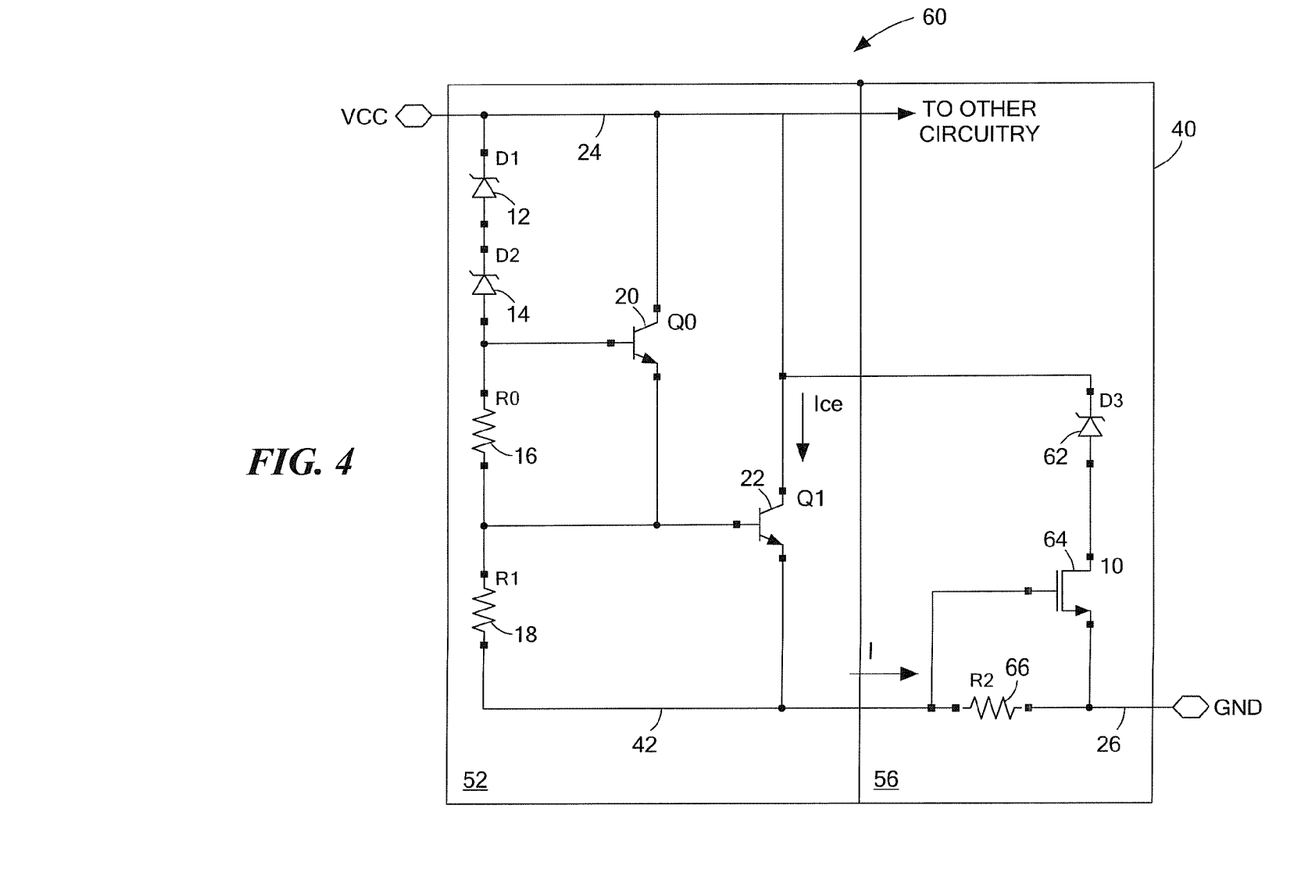
FIG. 4 is a schematic diagram illustrating another example zener-triggered power clamp circuit having enhanced ESD robustness in accordance with an implementation.

FIG. 4 is a schematic diagram illustrating another example zener-triggered power clamp circuit 60 having enhanced ESD robustness in accordance with an implementation. As illustrated, zener-triggered power clamp circuit 60 includes a first portion 52 that is similar to power clamp circuit 10 of FIG. 1. In addition, zener-triggered power clamp circuit 60 includes a second portion 56 that is designed to improve the ESD robustness of the circuit 60. As shown, second portion 56 of zener-triggered power clamp circuit 60 includes a zener diode 62, a transistor 64, and a resistor 66. Transistor 64 is intended to behave like a switch in zener-triggered power clamp circuit 60. That is, transistor 64 may toggle between an "off" condition having a high impendence between drain and source terminals and an "on" condition having a low impedance between drain and source terminals. Resistor 66 is coupled between intermediate node 42 and ground node 26 of zener-triggered power clamp circuit 60. As such, a current I flowing out of first portion 52 of zener-triggered power clamp circuit 60 will flow through resistor 66 on its way to ground. The voltage drop across resistor 66 is capable of turning transistor 64 on and off.

When transistor 64 is turned on, the anode terminal of zener diode 62 is connected to ground node 26. When zener diode 62 is connected to ground node 26, it is capable of entering breakdown mode and conducting current to ground. In at least one implementation, the breakdown voltage of zener diode 62 will be less than a voltage that will be on supply node 24 when zener diode 62 is connected to ground node 26 by transistor 64. Thus, zener diode 62 may enter breakdown mode immediately upon being connected to ground. Once in breakdown mode, zener diode 62 will provide an additional current path to ground through which ESD currents can flow to reduce the voltage on supply node 24. In addition, zener diode 62 will maintain a relatively constant voltage while in breakdown mode.

In the illustrated embodiment, transistor 64 is an n-channel insulated gate field effect transistor (IGFET) having a gate terminal that is connected to resistor 66. Thus, the voltage drop across resistor 66 will be applied to the gate of transistor 64. It should be appreciated that other types of transistors, or combinations of transistors, may be used in other implementations. Depending on the type of transistor used, however, modifications may be needed to power clamp circuit 60 of FIG. 4 to appropriately bias transistor 64 to turn on and off based on the current I.

In at least one implementation, the resistance value of resistor 66 may be selected so that zener diode 62 is coupled to ground node 26 at an opportune time. For example, it may be desired that zener diode 62 be coupled to ground node 26 sometime after first and second zener diodes 12, 14 have reached breakdown. In some implementations, the resistance value of resistor 66 may be selected so that zener diode 62 is coupled to ground node 26 at a time when a collector-emitter current flowing through second transistor 22 is above a primary breakdown current value $I_{T1}$. To determine the resistance value of resistor 66, it may first be determined what the current I out of first portion 52 of zener-triggered power clamp circuit 60 will be at the desired switch time. The resistance value may then be selected so that a required gate voltage is applied to transistor 64 to turn the transistor 64 on when that current level is achieved. In at least one implementation, a transistor 64 is used that has a relatively high breakdown voltage (e.g., much higher than the combined breakdown voltages of zener diodes 12, 14).

With reference to FIG. 4, zener diode 62 and transistor 64 will be operative for generating a modified snapback voltage in zener-triggered power clamp circuit 60. As described previously, in the zener-triggered power clamp circuit 10 of FIG. 1, the value of the snapback voltage $V_{SB}$ will be approximately equal to the common emitter breakdown voltage of second transistor 22 ($CEO_{Q1}$). In the zener-triggered power clamp circuit 60 of FIG. 4, on the other hand, the modified snap back voltage may be as follows:

$$V_{SB}' = BV_{D3} + VDS_{M0}$$

where $V_{SB}'$ is the modified snapback voltage, $BV_{D3}$ is the breakdown voltage of zener diode 62, and $VDS_{M0}$ is the drain-to-source voltage of transistor 64. In some implementations, zener diode 62 and/or transistor 64 may be selected and/or designed to achieve a desired level of additional voltage snapback on supply terminal 24 during an ESD event. For example, in one implementation, these components may be selected so that the modified snapback voltage is considerably less than the common emitter breakdown voltage of second transistor 22 (i.e., $V_{SB}' < CEO_{Q1}$).

As described above, the zener-triggered power clamp circuits 50, 60 of FIGS. 3 and 4 can be implemented within integrated circuits to, for example, protect other circuitry within the integrated circuits from damage due to ESD events and similar occurrences. The other circuitry can include any of a wide variety of different circuit types. In some implementations, the other circuitry may include sensor circuits such as, for example, position sensors, current sensors, speed sensors, proximity sensors, rotation sensors, or angle sensors. Such sensor circuits may take the form of a magnetic field sensor utilizing one or more magnetic field sensing elements, including but not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ).

In zener-triggered power clamp circuit 50 of FIG. 3 and zener-triggered power clamp circuit 60 of FIG. 4, first portion 42 is shown with two zener diodes 12, 14 and two transistors 20, 22. It should be appreciated that any number of zener diodes and any number of transistors may be used in first portion 42 in other implementations. For example, in one alternative embodiment, a single zener diode and a single transistor are used. In addition, as described previously, in some embodiments, other types of breakdown devices or circuits (i.e., other than zener diodes) may be used. Other clamp topologies or transistor types may also be used in other implementations.

Figure 5:
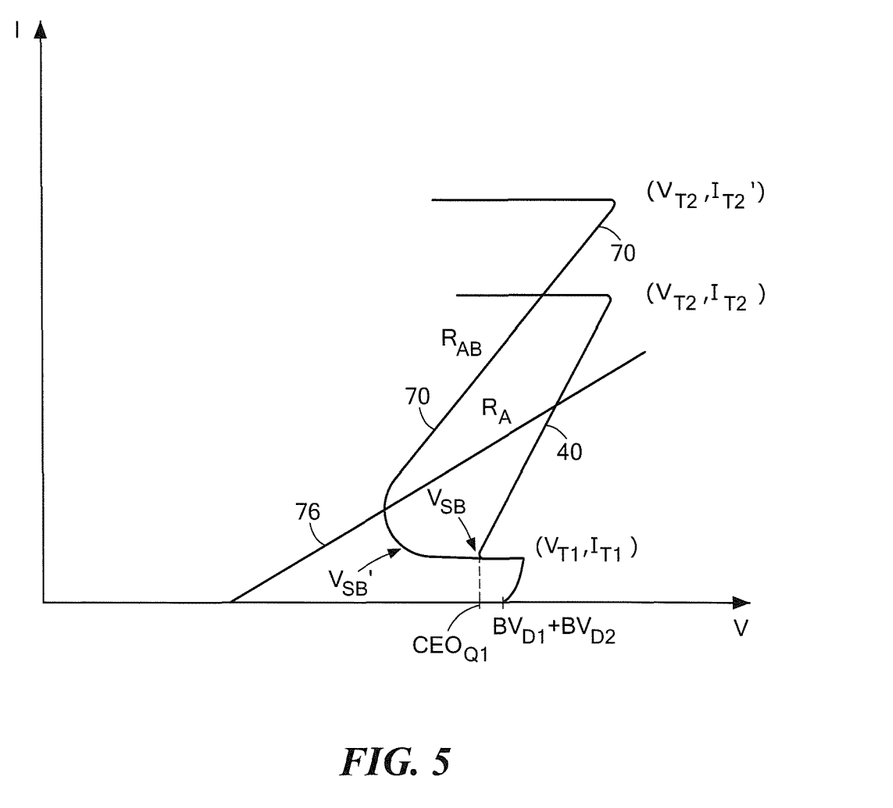
FIG. 5 is a graph illustrating a voltage-current curve of the zener-triggered power clamp circuit of FIG. 4.

FIG. 5 is a graph illustrating a current-voltage curve 70 of zener-triggered power clamp circuit 60 of FIG. 4. For purposes of comparison, the current-voltage curve 40 of FIG. 2, associated with zener-triggered power clamp circuit 10 of FIG. 1, is superimposed over voltage-current curve 70 in FIG. 5. The current-voltage curve 76 of zener diode 62 of FIG. 4 is also shown in FIG. 5. In the description that follows, reference is made to both FIG. 4 and FIG. 5. As shown in current-voltage curve 70 of FIG. 5, before voltage snapback, zener-triggered power clamp circuit 60 operates in a substantially similar manner to zener-triggered power clamp circuit 10 of FIG. 1. That is, the current of the clamp remains at zero as voltage increases until the combined breakdown voltage of first and second zener diodes 12, 14 (i.e., $BV_{D1} + BV_{D2}$) is reached. The current then quickly begins to rise. At some point thereafter, transistor 64 will turn on and connect zener diode 62 to ground node 26. In at least one implementation, resistor 66 and transistor 64 will be selected so that transistor 64 will turn on when the current through second transistor 22 transitions past the primary breakdown current of transistor 22, although other criteria may alternatively be used (e.g., a current threshold above the primary breakdown current, a current threshold below the primary breakdown current, etc.).

In at least one implementation, zener diode 62 will already be above its breakdown voltage when transistor 64 turns on, so it will immediately begin to conduct current. With reference to FIG. 5, the voltage on supply terminal 24 of power clamp circuit 60 (i.e., curve 70) will eventually snap back as before. However, while zener-triggered power clamp circuit 10 of FIG. 1 snaps back to $V_{SB}$, the zener-triggered power clamp circuit 60 of FIG. 4 may snap back a much larger distance to $V_{SB}'$, which is significantly lower than $CEO_{Q1}$. As stated above, the modified snapback voltage $V_{SB}'$ may be equal to the sum of the breakdown voltage of diode 62 and the drain to source voltage of transistor 64 at the time of snap back. In addition, as shown in FIG. 5, secondary breakdown occurs at a much higher current level $I_{T2}'$ in the voltage-current curve 70 of zener-triggered power clamp circuit 60. Thus, larger electrostatic discharge events may be handled using the zener-triggered power clamp circuit 60 than using the circuit 10 of FIG. 1.

In both of the current-voltage curves 40, 70 of FIG. 5, the portion of the curve between the snapback voltage and secondary breakdown is a relatively straight line having a corresponding dynamic resistance (i.e., dynamic resistance $R_A$ in curve 40 and dynamic resistance $R_{AB}$ in curve 70). Notably, the dynamic resistance $R_{AB}$ of curve 70 is larger than the dynamic resistance $R_A$ of curve 40. This increase in dynamic resistance can help improve the stability of zener-triggered power clamp circuit 60 over clamp circuit 10 of FIG. 1.

Figure 6:
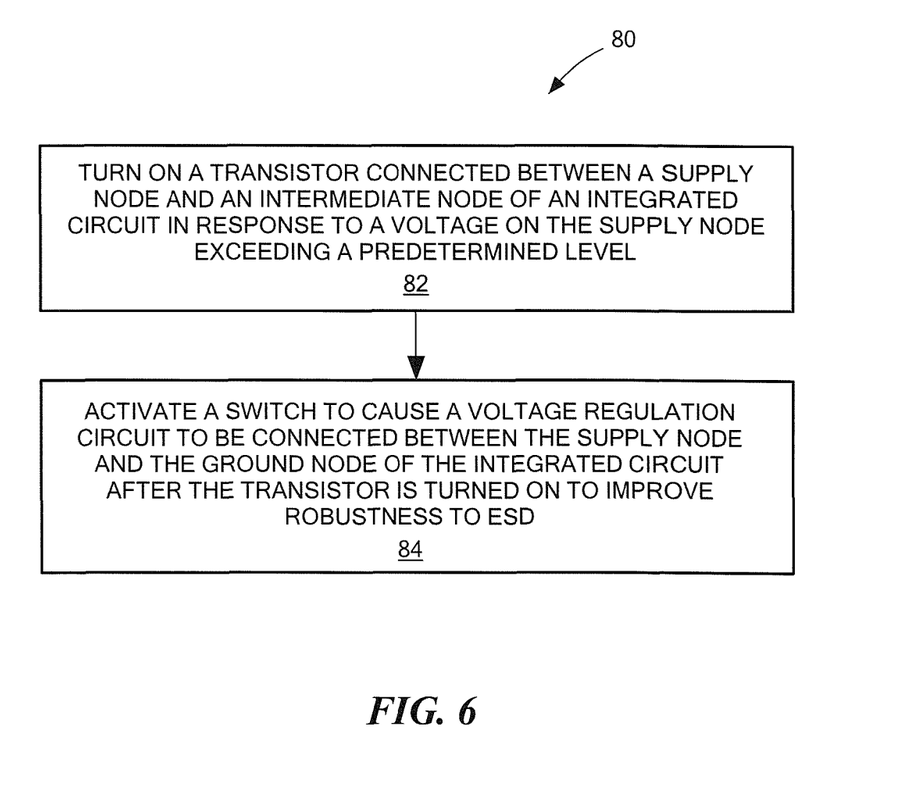
FIG. 6 is a flowchart illustrating a method for operating a power clamp circuit in accordance with an implementation.

FIG. 6 is a flowchart illustrating a method 80 for operating a power clamp circuit in accordance with an implementation. The method 80 may be used with zener-triggered power clamps as well as other types of power clamps. When a voltage on a supply node of an integrated circuit exceeds a predetermined level, a transistor connected between the supply node and an intermediate node of the integrated circuit is turned on (block 82). For example, transistor 22 of FIGS. 3 and 4 may be turned on in response to the voltage on supply node 24 exceeding the combined breakdown voltages of zener diodes 12, 14. A switch may then be activated to cause a voltage regulation circuit to be connected between the supply node and a ground node of the integrated circuit to improve the robustness of the power clamp circuit to ESD (block 84). The voltage regulation circuit may include a single device (such as a zener diode, an avalanche diode, an SCR, etc.) or a combination of different devices (e.g., multiple zener diodes connected in series, multiple forward biased diodes connected in series, a more complex voltage regulator circuit, etc.). The switch may be activated using, for example, an ESD current generated, at least in part, by the transistor.

In the description above, certain techniques and concepts are described in the context of zener-triggered power clamp circuits. It should be appreciated, however, that these techniques and concepts also have application in other types of power clamp circuits, including power clamps that do not use zener diodes. The techniques and concepts may also be used with power clamp circuits using different architectures than those described herein.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. An integrated circuit comprising:
a supply node;
a ground node; and
a power clamp circuit coupled between the supply node and the ground node to protect the integrated circuit from a surge in voltage on the supply node, the power clamp circuit including;
a breakdown circuit coupled to the supply node to enter breakdown and conduct current away from the supply node when a voltage on the supply node exceeds a breakdown voltage;
at least one transistor coupled between the supply node and an intermediate node, the at least one transistor to turn on if the current through the breakdown circuit exceeds a predetermined level to provide a current flow path from the supply node to the intermediate node;
a voltage regulation circuit coupled to the supply node; and
a current controlled switch coupled to the voltage regulation circuit, the ground node, and the intermediate node, the current controlled switch to connect the voltage regulation circuit to the ground node if a current flowing between the intermediate node and the ground node exceeds a threshold level, wherein the voltage regulation circuit is configured to, when connected to the ground node, cause the voltage on the supply node to snap back to a value that is lower than a breakdown voltage associated with the at least one transistor to improve the robustness of the power clamp circuit to electrostatic discharge (ESD).

2. The integrated circuit of claim 1, wherein:
the current controlled switch is configured to couple the voltage regulation circuit to the ground node after the breakdown circuit reaches breakdown.

3. The integrated circuit of claim 1, wherein:
the current controlled switch includes a transistor having an input terminal and first and second output terminals, wherein the first output terminal is coupled to the voltage regulation circuit and the second output terminal is coupled to the ground node, wherein the power clamp circuit causes the voltage on the supply node to snap back to a snapback voltage $V_{SB}'$, after the voltage regulation circuit is connected to the ground node, that is approximately equal to a sum of the voltage of the voltage regulation circuit and the voltage across the first and second output terminals of the transistor of the current controlled switch.

4. The integrated circuit of claim 3, wherein:
the at least one transistor includes a bipolar junction transistor (BJT); and
the snapback voltage $V_{SB}'$ is less than a common emitter breakdown voltage of the BJT.

5. The integrated circuit of claim 3, wherein:
the transistor of the current controlled switch includes an insulated gate field effect transistor (IGFET), the input terminal of the transistor includes a gate terminal of the IGFET, and the first and second output terminals of the transistor include drain and source terminals of the IGFET, respectively.

6. The integrated circuit of claim 1, wherein:
the current controlled switch includes a resistor and a transistor, the resistor being coupled between the intermediate node and the ground node and the transistor being coupled between the voltage regulation circuit and the ground node, wherein a voltage drop across the resistor forms an input signal of the transistor.

7. The integrated circuit of claim 1, wherein:
the voltage regulation circuit includes a zener diode.

8. The integrated circuit of claim 1, wherein:
the breakdown circuit includes at least one zener diode.

9. The integrated circuit of claim 1, further comprising:
first and second resistors connected between the breakdown circuit and the intermediate node to conduct current from the breakdown circuit to the intermediate node when the breakdown circuit is conducting, wherein the first and second resistors generate bias signals for the at least one transistor;
wherein the at least one transistor includes:
  a first transistor having an input terminal and first and second output terminals, the input terminal of the first transistor being coupled to a node between the breakdown circuit and the first resistor, the first output terminal of the first transistor being coupled to the supply node, and the second output terminal of the first transistor being coupled to a node between the first and second resistors; and
  a second transistor having an input terminal and first and second output terminals, the input terminal of the second transistor being coupled to the node between the first and second resistors, the first output terminal of the second transistor being coupled to the supply node, and the second output terminal of the second transistor being coupled to the intermediate node, wherein the second transistor forms a main ESD path to ground during ESD events.

10. The integrated circuit of claim 1, wherein:
the at least one transistor includes a bipolar junction transistor.

11. The integrated circuit of claim 1, further comprising:
sensor circuitry coupled between the supply node and the ground node, wherein the power clamp circuit protects the sensor circuitry from damage caused by voltage surges on the supply node.

12. The integrated circuit of claim 11, wherein the sensor circuitry comprises a magnetic field sensor.

13. The integrated circuit of claim 12, wherein:
the magnetic field sensor comprises at least one of a Hall effect element or a magnetoresistance element.

14. A method for operating a power clamp circuit comprising:
turning on a transistor coupled between a supply node and a ground node of an integrated circuit in response to a voltage on the supply node exceeding a breakdown voltage of a breakdown circuit coupled to the supply node, the transistor to conduct current from the supply node to the ground node when turned on; and
activating a switch to cause a voltage regulation circuit to be coupled between the supply node and the ground node after the transistor is turned on, the voltage regulation circuit configured to cause the voltage on the supply node to snap back to a value that is lower than a breakdown voltage associated with the transistor thereby improving the robustness of the power clamp circuit to electrostatic discharge (ESD).

15. The method of claim 14, wherein:
activating a switch occurs when a current though the transistor exceeds a primary breakdown current ($I_{T1}$) of the transistor.

16. The method of claim 14, wherein:
activating a switch includes applying an input signal to a second transistor.

17. The method of claim 16, wherein:
activating a switch causes a snapback voltage of the power clamp circuit to be approximately equal to a sum of the regulated voltage of the voltage regulation circuit and a voltage of the second transistor.

18. The method of claim 16, wherein:
the second transistor includes an n-channel insulated gate field effect transistor (IGFET) and the input signal is derived from a voltage drop across a resistor.

19. The method of claim 14, wherein:
the voltage regulation circuit includes a zener diode.

20. The method of claim 14, wherein:
the voltage regulation circuit includes a plurality of diodes connected in series.

21. The method of claim 14, wherein:
the transistor is a first transistor; and
turning on the first transistor coupled between the supply node and the ground node includes: turning on a third transistor in response to the voltage on the supply node exceeding the breakdown voltage of the breakdown circuit, wherein a current generated by turning on a third transistor causes the first transistor to turn on.

22. The method of claim 14, wherein:
the breakdown circuit includes multiple zener diodes coupled in series and the breakdown voltage includes a sum of the breakdown voltages of the multiple zener diodes.

23. An integrated circuit comprising:
a supply node;
a ground node; and
a power clamp circuit coupled to the power node to protect the integrated circuit from electrostatic discharge events and other noise events that can cause a surge in the voltage on the supply node, the power clamp circuit including:
  a first portion configured to conduct current away from the supply node in response to a voltage on the supply node exceeding a predetermined voltage level, the first portion including a transistor to conduct at least some of the current away from the supply node; and
  a second portion configured to couple a regulated voltage level to the supply node if magnitude of current conducted away from the supply node by the first portion exceeds a threshold value, wherein the regulated voltage level below a breakdown voltage associated with the transistor of the first portion and improves the robustness of the power clamp circuit to electrostatic discharge (ESD).

24. The integrated circuit of claim 23, wherein:
the second portion includes a voltage regulation circuit and a current controlled switch, the voltage regulation circuit being coupled to supply node, wherein the current controlled switch is configured to connect the voltage regulation circuit to a ground node if the amount of current conducted away from the supply node by the first portion exceeds the threshold value.

25. The integrated circuit of claim 24, wherein:
the voltage regulation circuit includes a zener diode.

26. The integrated circuit of claim 24, wherein:
the voltage regulation circuit includes a plurality of diodes connected in series.

27. The integrated circuit of claim 23, wherein:
the transistor of the first portion is a bipolar junction transistor (BJT);
the breakdown voltage associated with the transistor is a common emitter breakdown voltage of the BJT; and the second portion of the power clamp circuit is configured to reduce the snap back voltage that would be achieved by the first portion of the power clamp circuit acting alone.

28. The integrated circuit of claim 23, further comprising:
sensor circuitry coupled between the supply node and the ground node, wherein the power clamp circuit protects the sensor circuitry from damage caused by voltage surges on the supply node.

29. The integrated circuit of claim 28, wherein:
the sensor circuitry comprises a magnetic field sensor.

30. The integrated circuit of claim 29, wherein:
the magnetic field sensor comprises at least one of a Hall effect element or a magnetoresistance element.

\* \* \* \* \*

UNITED STATES PATENT AND TRADEMARK OFFICE
CERTIFICATE OF CORRECTION

| | | |
|---|---|---|
| PATENT NO. | : 8,922,962 B2 | |
| APPLICATION NO. | : 13/524027 | |
| DATED | : December 30, 2014 | |
| INVENTOR(S) | : Washington Lamar et al. | |

It is certified that error appears in the above-identified patent and that said Letters Patent is hereby corrected as shown below:

Specification

Column 4, line 26 delete "though" and replace with --through--.

Column 5, line 4 delete "impedence" and replace with --impedance--.

Claims

Column 9, line 62 claim 16 delete "though" and replace with --through--.

Signed and Sealed this
Nineteenth Day of January, 2016

Michelle K. Lee
*Director of the United States Patent and Trademark Office*